(12) United States Patent
Pecnak (10) Patent No.: US 11,299,038 B2
(45) Date of Patent: Apr. 12, 2022

(54) FUEL FILLER STRUCTURE (71) Applicant: Nissan North America, Inc., Franklin, TN (US)

(72) Inventor: Jeffrey Pecnak, Howell, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 112 days.

(21) Appl. No.: 16/817,387

(22) Filed: Mar. 12, 2020

(65) Prior Publication Data

US 2021/0284013 A1 Sep. 16, 2021

(51) Int. Cl.
*B60K 15/05* (2006.01)
*B60K 15/04* (2006.01)
*B62D 33/02* (2006.01)
*B62D 25/16* (2006.01)

(52) U.S. Cl.
CPC .......... *B60K 15/0406* (2013.01); *B60K 15/05* (2013.01); *B62D 25/16* (2013.01); *B62D 33/02* (2013.01); *B60K 2015/053* (2013.01)

(58) Field of Classification Search
CPC ...... B60K 2015/053; B60K 2015/0515; B60K 15/0406; B60K 15/05; B62D 25/16; B62D 33/02
USPC ................................. 220/86.2, 375
See application file for complete search history.

(56) References Cited

U.S. PATENT DOCUMENTS

| 4,320,853 A | 3/1982 | Moore |
| 4,705,190 A | 11/1987 | Mizusawa |
| 5,150,808 A * | 9/1992 | Hamilton ........... B60K 15/0406 220/255 |
| 5,437,491 A * | 8/1995 | Nedbal ............. B60K 15/0406 220/86.2 |
| 5,462,190 A * | 10/1995 | Lienhart ........... B60K 15/0406 220/375 |
| 5,732,841 A * | 3/1998 | Jocic .................. B60K 15/0406 220/203.24 |
| 6,332,553 B1 | 12/2001 | Kamada et al. |
| 8,141,736 B2 | 3/2012 | Takahashi et al. |
| 2002/0021017 A1 * | 2/2002 | Foltz ..................... B60K 15/05 296/97.22 |

(Continued)

FOREIGN PATENT DOCUMENTS

| DE | 19962956 A1 | 6/2001 |
| JP | 5390293 B2 | 1/2014 |

OTHER PUBLICATIONS

Toyota, Tacoma, 2016 model year.

(Continued)

*Primary Examiner* — Gregory A Blankenship
(74) *Attorney, Agent, or Firm* — Global IP Counselors, LLP (57) ABSTRACT A fuel filler structure includes a vehicle body panel, a filler housing, a filler tube cap and a tether. The vehicle body panel defines a fuel filler opening. The filler housing has an outboard side and an inboard side. The outboard side is installed to the vehicle body panel at least partially surrounding the fuel filler opening and is dimensioned to receive and surround a portion of a fuel filler tube. The filler tube cap is configured to removably attach to the fuel filler tube at least partially within the filler housing. The tether is attached at a first end to the filler tube cap and is attached at a second end to the filler housing for pivoting movement about a vertical axis.

17 Claims, 7 Drawing Sheets

(56) References Cited

U.S. PATENT DOCUMENTS

| | | | |
|---|---|---|---|
| 2004/0056238 A1* | 3/2004 | Hagano | B60K 15/0406 252/500 |
| 2005/0092752 A1* | 5/2005 | Hagano | B60K 15/0406 220/375 |
| 2007/0278231 A1* | 12/2007 | Newport | B60K 15/0406 220/375 |
| 2010/0237650 A1* | 9/2010 | Takahashi | B60K 15/0406 296/97.22 |
| 2015/0114960 A1* | 4/2015 | Dringenberg | B60K 15/04 220/86.2 |
| 2019/0184818 A1* | 6/2019 | Takashi | B60K 15/05 |
| 2020/0215903 A1* | 7/2020 | Uehata | B60K 15/05 |
| 2020/0324646 A1* | 10/2020 | Herczeg | B60L 53/16 |
| 2020/0384853 A1* | 12/2020 | Mimura | B60R 25/24 |
| 2021/0016658 A1* | 1/2021 | Krauss | B29C 45/1676 |
| 2021/0095501 A1* | 4/2021 | Eberle | B60K 15/05 |
| 2021/0284013 A1* | 9/2021 | Pecnak | B62D 25/16 |

OTHER PUBLICATIONS

Ford, Ranger, 2019 model year.
Chevy, Colorado, 2015 model year.
Honda, Ridgeline, 2017 model year.

* cited by examiner

FUEL FILLER STRUCTURE

BACKGROUND

Field of the Invention

The present invention generally relates to fuel filler structure. More specifically, the present invention relates to fuel filler structure that includes a tether that pivot freely with a filler tube cap during re-fueling of a vehicle.

Background Information

Fuel filler housings with tether structures for filler tube caps are well known. However, in older vehicle designs, the tether structure pivot about a horizontal axis or pivots about an axis that is inclined relative to vertical.

SUMMARY

One object is to provide a fuel filler structure with an overall shape the blends in with the proximity of a wheel well structure of a vehicle.

Another object is to provide a fuel filler structure with a tether that is designed to more freely pivot with movement of a filler tube cap in an out of the fuel filler structure during re-fueling of a vehicle.

In view of the state of the known technology, one aspect of the present disclosure is to provide a fuel filler structure with a vehicle body panel, a filler housing, a filler tube cap and a tether. The vehicle body panel defines a fuel filler opening. The filler housing has an outboard side and an inboard side. The outboard side is installed to the vehicle body panel at least partially surrounding the fuel filler opening and is dimensioned to receive and surround a portion of a fuel filler tube. The filler tube cap is configured to removably attach to the fuel filler tube at least partially within the filler housing. The tether is attached at a first end to the filler tube cap and is attached at a second end to the filler housing for pivoting movement about a vertical axis.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
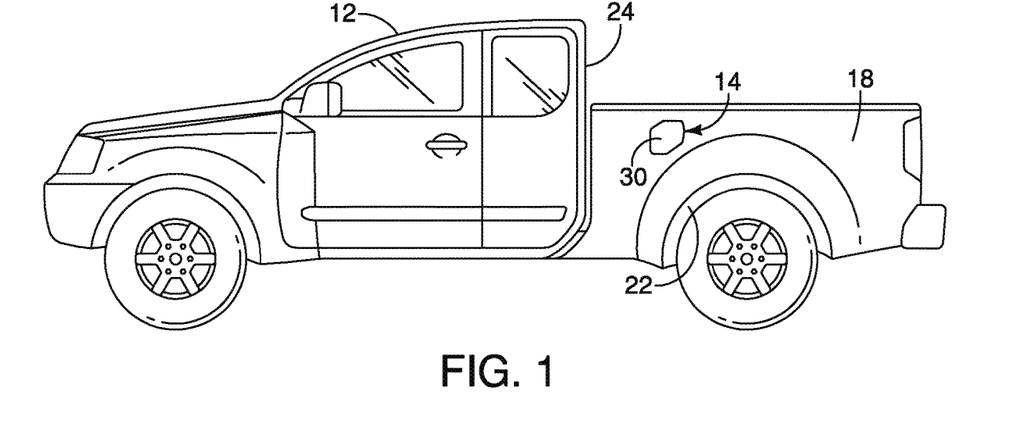
FIG. 1 is a side view of a vehicle that includes a fuel filler structure that includes a door shown in a closed orientation in accordance with one depicted embodiment.

Referring initially to FIG. 1, a vehicle 10 with a vehicle body structure 12 that includes a fuel filler structure 14 is illustrated in accordance with a first embodiment.

In the depicted embodiment, the vehicle 10 is shown as a pickup truck. However, it should be understood that the features of the fuel filler structure 14 and surrounding portions of the vehicle body structure 12 can be employed in any of a variety of vehicle designs, such as an SUV (sports utility vehicle), a sedan, a coupe and/or commercial vehicles.

As shown in FIG. 1, a side body panel 18 (also referred to as a body panel 18 and a vehicle body panel 18) of the vehicle body structure 12 includes a fuel filler opening 20 and at least partially defines a wheel well portion 22. The fuel filler opening 20 is located above and adjacent to the wheel well portion 22. In other words, the wheel well portion 22 is adjacent to and below the fuel filler opening 20. As shown in FIG. 1, the fuel filler opening 20 is located forward of a central portion of the wheel well opening 22 between a cabin structure 24 of the vehicle body structure 12 and the central portion of the wheel well opening 22. Further, the appearance and overall shape of the opening 20 compliments the curved shape of the wheel well portion 22.

Figure 2:
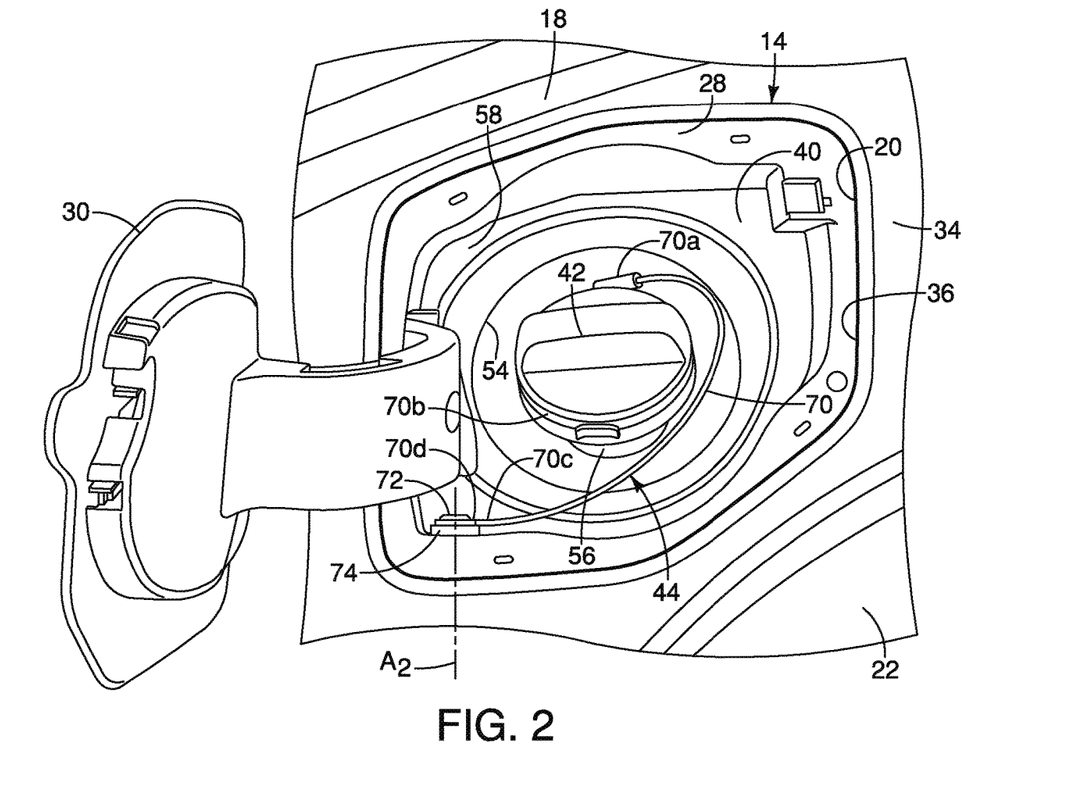
FIG. 2 is a side view of a portion of the vehicle depicted in FIG. 1, showing the fuel filler structure with the door in an open orientation exposing a filler tube cap, a filler housing and a tether in accordance with the depicted embodiment.
Figure 9:
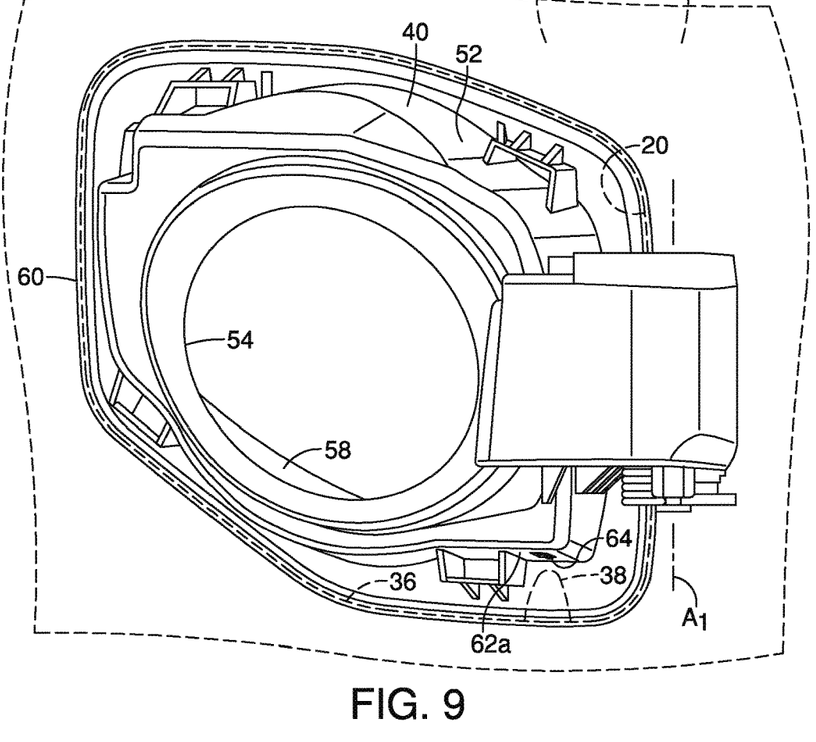
FIG. 9 is an inboard perspective view of the filler housing removed from the vehicle showing a door hinge support structure, an underside of the horizontal surface and the fixture opening in accordance with the depicted embodiment.
Figure 10:
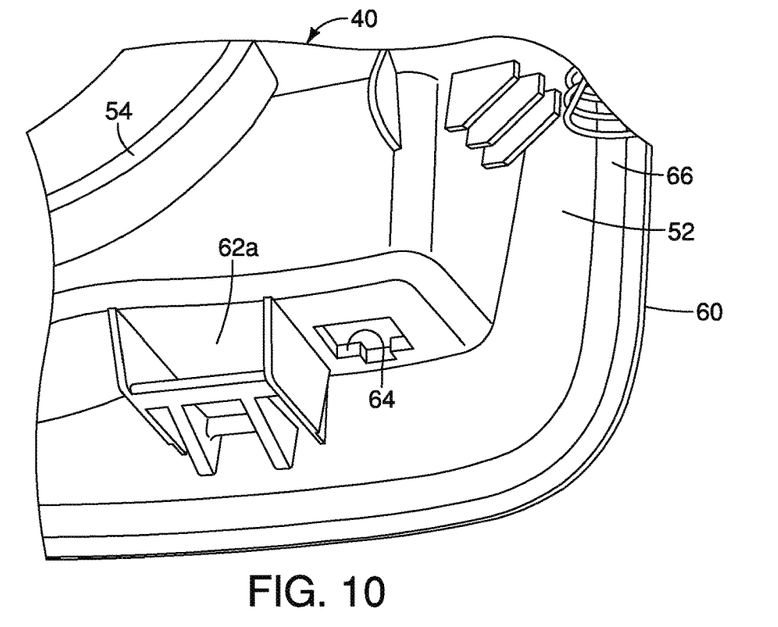
FIG. 10 is another inboard perspective view of a lower portion of the filler housing showing the underside of the horizontal surface and the fixture opening in accordance with the depicted embodiment.

The body panel 18 has an inboard surface 32 (FIG. 9) and an outboard surface 34 (FIGS. 1-7) with the fuel filler opening 20 extending from the outboard surface 34 to the inboard surface 32. As shown in FIG. 2, the body panel 18 includes a recessed area 28 that surrounds the fuel filler opening 20. As described further below, the recessed area 28 is dimensioned and shaped in a manner similar to a door 30. The door 30 is movable between an open orientation (FIG. 2) and a closed orientation (FIG. 1). With the door 30 in the closed orientation, the outboard surface of the door 30 is preferably flush with an outboard surface 34 of the body panel 18.

The recessed area 28 of the body panel and the door 30 are designed with similar non-rectangular shapes. Specifically, as shown in FIG. 1, the door 30 is designed with six edge portions where each edge portion is angularly offset from adjacent ones of the six edge portions by angles that are 90 degrees or more. Similarly, as shown in FIG. 2, the recessed area 28 of the body panel 18 designed with a corresponding set of six edge portions, where each edge portion is angularly offset from adjacent ones of the six edge portions. In other words, the shape of the door 30 and the shape of the recessed area 28 complement one another.

The fuel filler opening 20 of the vehicle body panel 18 is defined by a peripheral edge 36 encircling the fuel filler opening 20. A lower edge section of the peripheral edge 36 includes a projection 38 that extends upward from the peripheral edge 36 into the fuel filler opening 20.

A description of the fuel filler structure 14 is now provided with reference to FIGS. 2-13. The fuel filler structure 14 includes a filler housing 40, a filler tube cap 42, a tether 44, the door 30 and surrounding portions of the body panel 18 including the projection 38.

Figure 3:
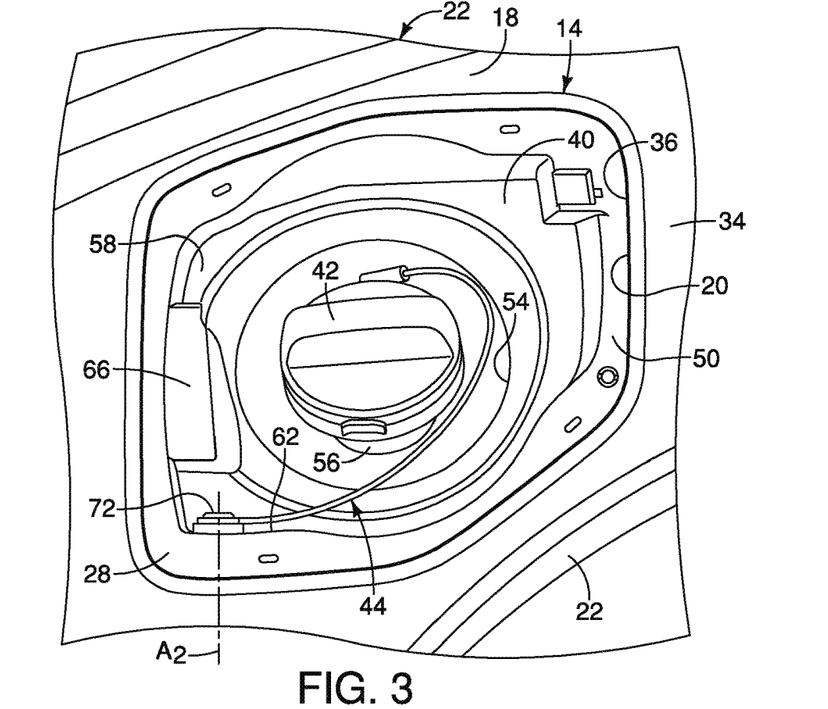
FIG. 3 is another side view of the fuel filler structure with the door completely removed showing a small chamber defined within the filler housing, and a pivot pin attached to a horizontal surface of the chamber with a flexible line of the tether free to pivot about a vertical axis defined by the pivot pin in accordance with the depicted embodiment.
Figure 4:
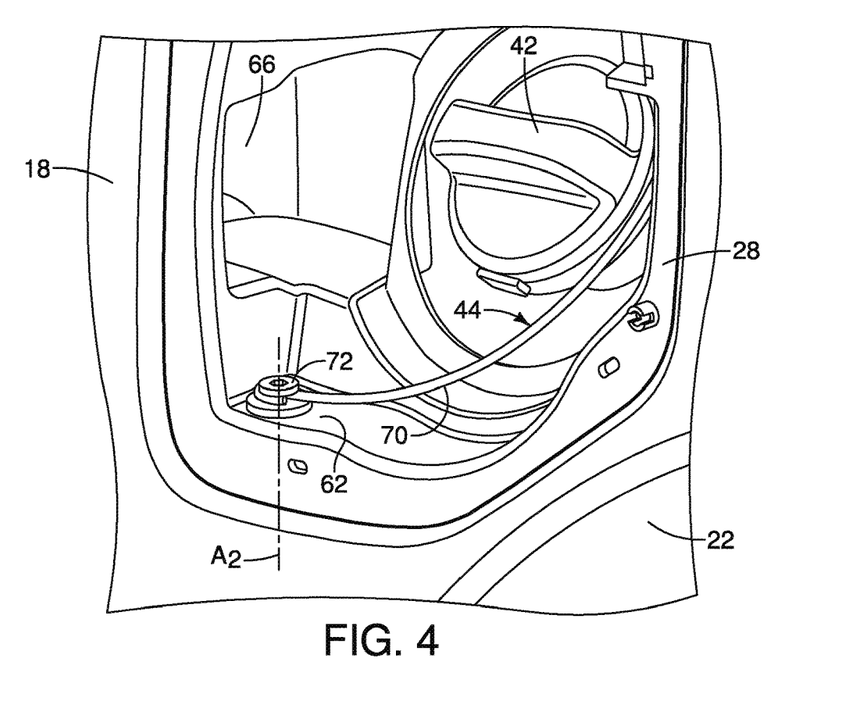
FIG. 4 is a perspective side view of the fuel filler structure with the door completely removed showing further details of the chamber defined within the filler housing, along with the pivot pin, the horizontal surface of the chamber and the flexible line of the tether free to pivot about the vertical axis defined by the pivot pin in accordance with the depicted embodiment.
Figure 5:
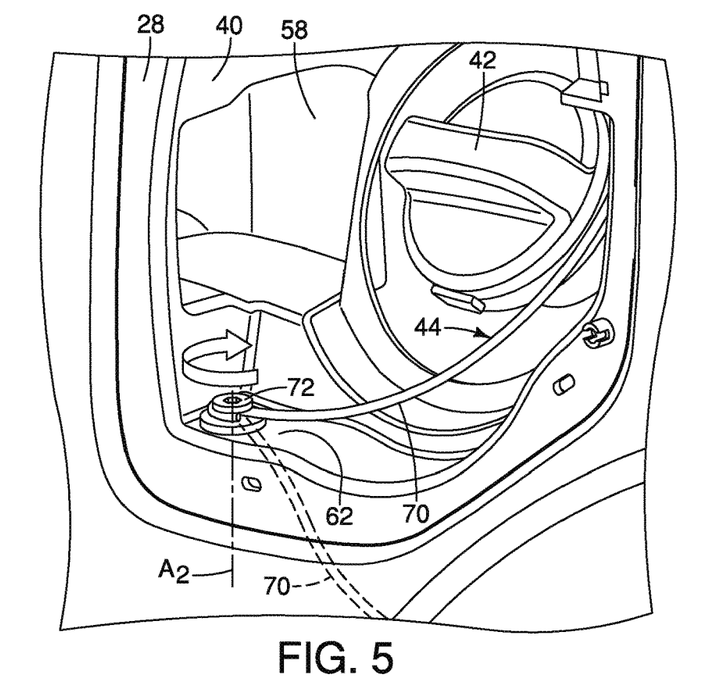
FIG. 5 is another perspective side view of the fuel filler structure with the door completely removed showing the tether and fuel filler cap in a stowed orientation in solid lines, and showing the tether pivoted about the vertical axis of the pivot pin in a re-fueling orientation in phantom lines in accordance with the depicted embodiment.

The filler housing 40 is a molded member that can be made of any of a variety of materials, including metal, metal alloy, non-ferrous metal materials, resinous materials, fiberglass materials, plastic materials and/or polymer materials. The filler housing 40 has an outboard side 50 (FIGS. 3-6 and 8), an inboard side 52 (FIGS. 9-11) and an opening 54 that extends from the outboard side 50 to the inboard side 52. The opening 54 is dimensioned and located such that a filler tube 56 of a fuel tank (not shown) is accessible therethrough, as shown in FIGS. 3, 4 and 5.

The filler housing 40 is shaped and dimensioned such that the outboard side 50 defines a small chamber 58 that surrounds the opening 54 such that the filler tube 56 and the filler tube cap 42 are accessed through the opening 54. The outboard side 50 of the filler housing 40 includes an outer peripheral edge 60 that is fixedly attached to the inboard surface 32 of the vehicle body panel 18 along the peripheral edge 36. When installed to the inboard surface 32 of the body panel 18, outer peripheral edge 60 of the filler housing 40 contacts and is attached to the peripheral edge 36 of the body panel 18.

The filler housing 40 further includes a horizontally extending surface 62 within the chamber 58 that defies a fixture opening 64. The fixture opening 64 is vertically oriented such that the fixture opening 64 is exposed from above along the horizontally extending surface 62 and is further exposed from below along an underside 62a of the horizontally extending surface 62. The horizontally extending surface 62 is preferably located below the opening 54 and the filler tube 56.

Figure 8:
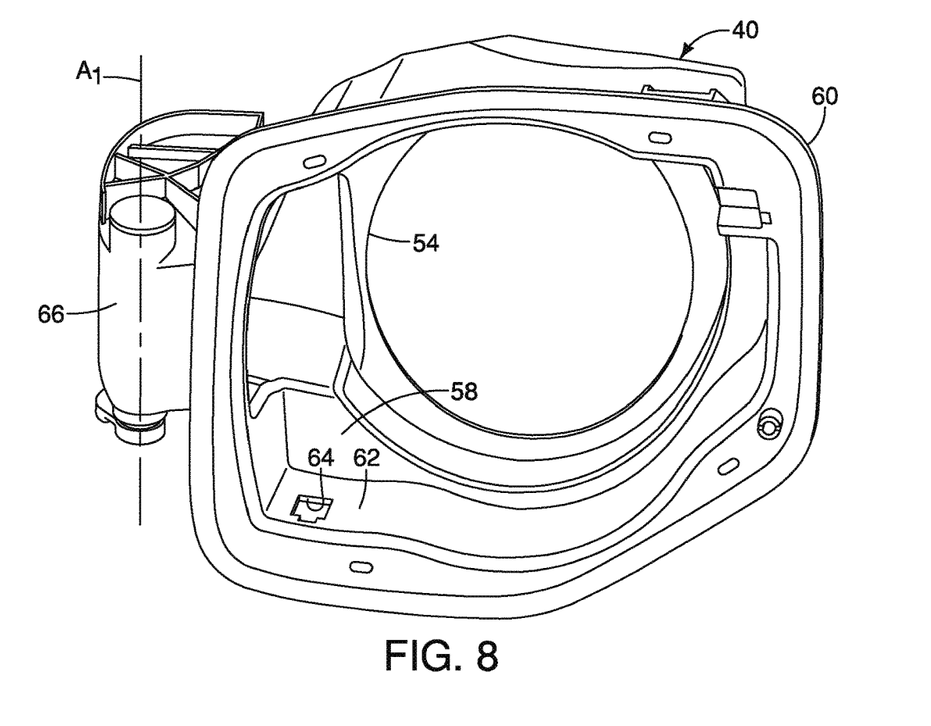
FIG. 8 is an outboard perspective view of the filler housing removed from the vehicle showing a door hinge support structure, the horizontal surface and a fixture opening that is dimensioned to receive a pin receiving fixture (not shown) that retains the pivot pin (not shown) in accordance with the depicted embodiment.

The filler housing 40 further includes a hinge support structure 66 that is located adjacent to the chamber 58 with an opening 68 defined therebetween. As shown in FIGS. 2 and 8, the door 30 is mounted to the hinge support structure 66 of the filler housing 40 for pivotal movement between the closed orientation (FIG. 1) and the open orientation (FIG. 2) about an axis $A_1$ (FIG. 8). When the door 30 in the closed position, the filler housing 40, the filler tube cap 42 and the tether 44 are all concealed behind the door 30. Since fuel door hinge structures are conventional structures, further description is omitted for the sake of brevity.

The filler tube cap 42 is designed to removably attached to the filler tube 56 in a conventional manner. Since filler tube caps and filler tubes of a fuel tank are conventional features, further description of the relationship therebetween is omitted for the sake of brevity.

As shown in FIGS. 8-11, the fixture opening 64 is located adjacent to the hinge support structure 66, and, as mentioned above, is vertically oriented. The fixture opening 64 is shaped and dimensioned to retain one end of the tether 44, as is described below initially with specific reference to FIG. 13.

Figure 6:
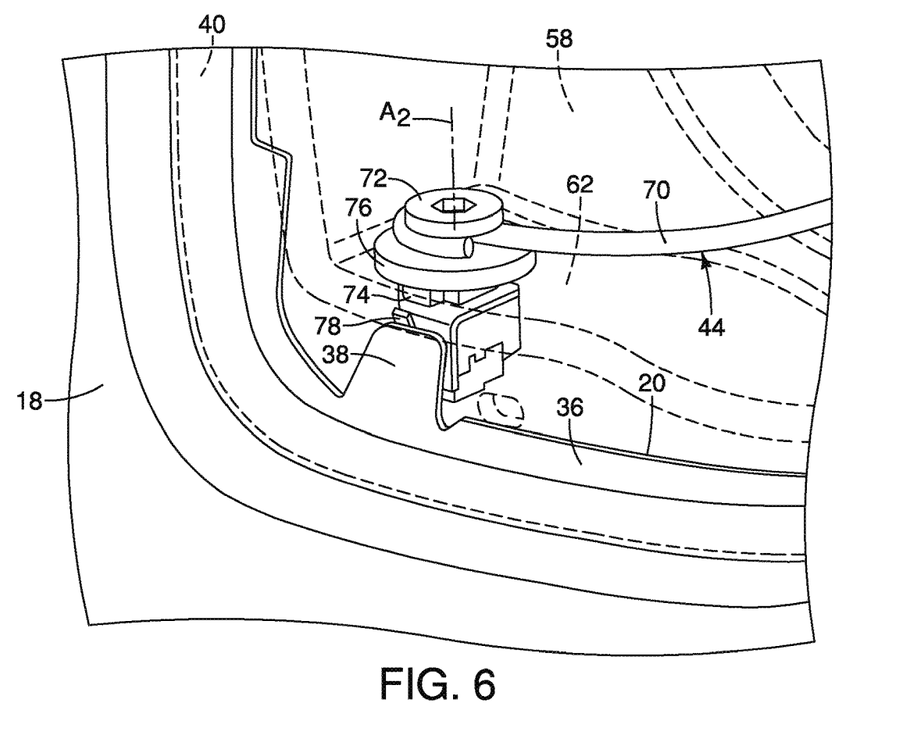
FIG. 6 is yet another perspective side view of the fuel filler structure showing further details of the tether, including a pin receiving fixture and electrically conductive metal member contacting a projection extending from an edge of the body panel creating an electrical ground connection between the tether and the body panel in accordance with the depicted embodiment.
Figure 7:
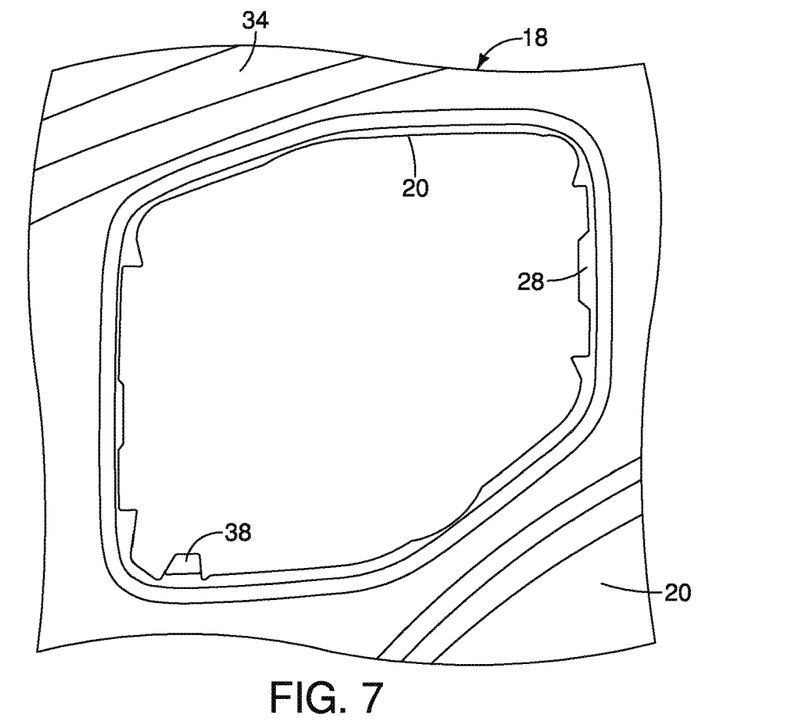
FIG. 7 is a side view of the body panel with the filler housing and door removed showing the projection extending from the edge of the body panel in accordance with the depicted embodiment.

The outer peripheral edge 60 of the filler housing 40 is installed to the vehicle body panel 18 at least partially or fully surrounding the fuel filler opening 20. The filler housing 40 can attach to the inboard surface 32 of the body panel 18 via snap fitting projections (not shown), mechanical fasteners (not shown) and/or adhesive material. However, if the filler housing 40 is made of a metallic material, it can alternatively be welded to the body panel 18. During installation of the filler housing 40, the projection 38 of the peripheral edge 38 of the body panel 18 is located inboard of the adjacent portion of the filler housing 40 such that the projection 38 is position below the horizontally extending surface 62 adjacent to the fixture opening 62, as shown in FIGS. 6 and 11.

Figure 13:
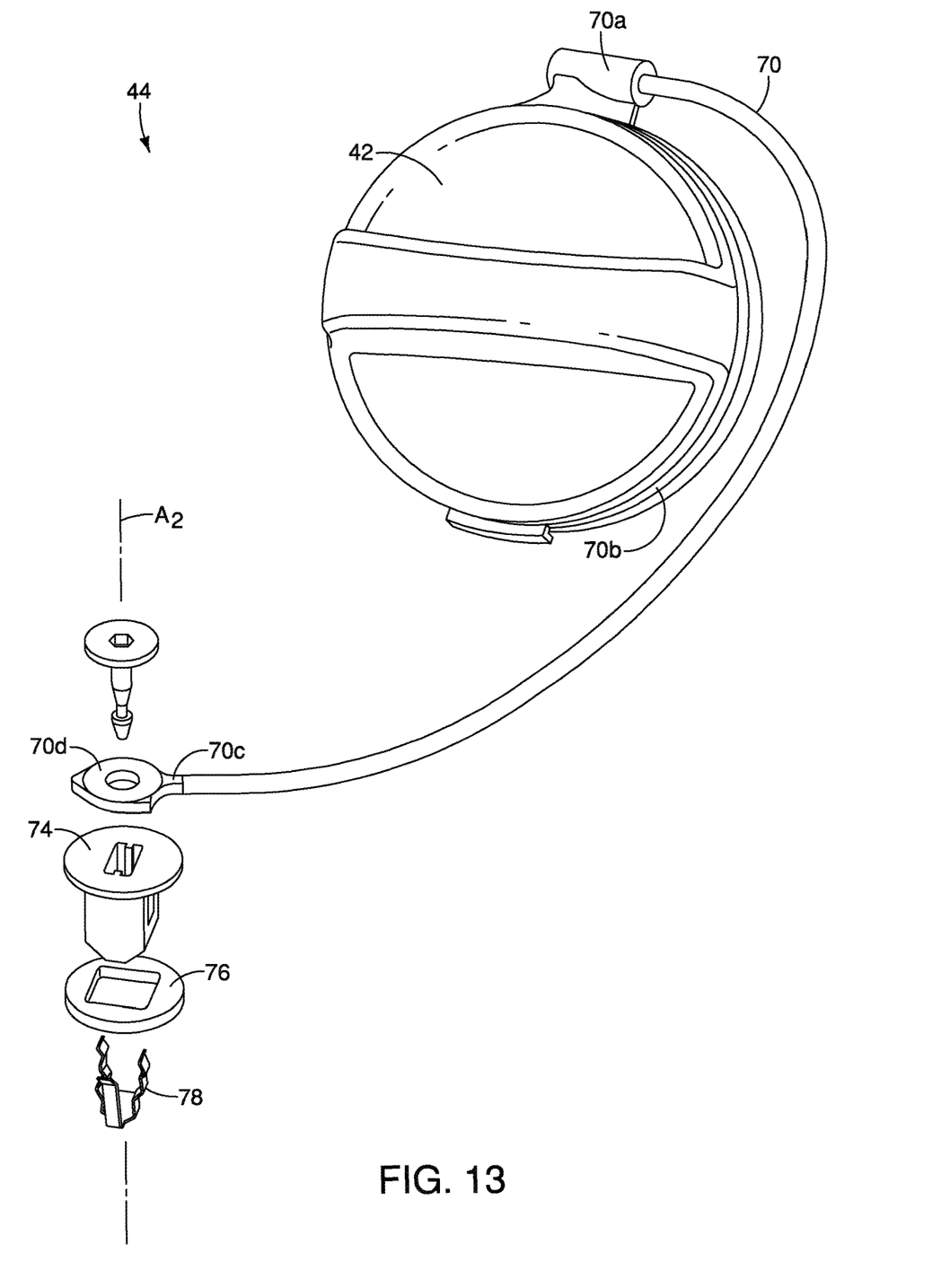
FIG. 13 is an exploded view of the tether showing the flexible line, the pivot pin, the pin receiving fixture, a washer and the electrically conductive member 70 in accordance with the depicted embodiment.

A description of the tether 44 is now provided with specific reference to FIG. 13. The tether 44 includes a thick gauge flexible line 70, a pivot pin 72, a pin receiving fixture 74 (also referred to as a retaining member), a washer 76 and an electrically conductive metal member 78.

The thick gauge flexible line 70 can be made of, for example, nylon, plastic or polymer materials. A first end 70a of the flexible line 70 includes an annular ring 70b that is fitted into a corresponding annular recess of the filler tube cap 42 such that the filler tube cap 42 can freely rotate within the annular ring 70b. A second end 70c of the flexible line 70 includes a flat attachment portion 70d that includes a central opening 70e.

Figure 11:
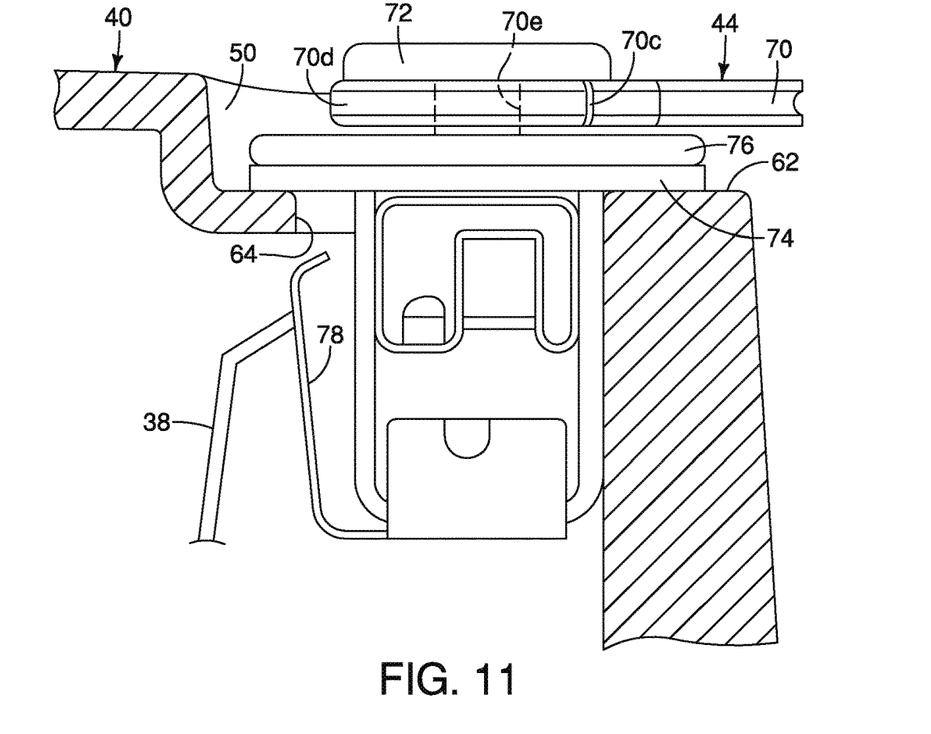
FIG. 11 is a cross-sectional view of a portion of the filler housing shown the horizontal surface with the pin receiving fixture installed to the fixture opening and the pivot pin installed to the pin receiving fixture with the projection of the body panel contacting an electrically conductive member of the tether in accordance with the depicted embodiment.
Figure 12:
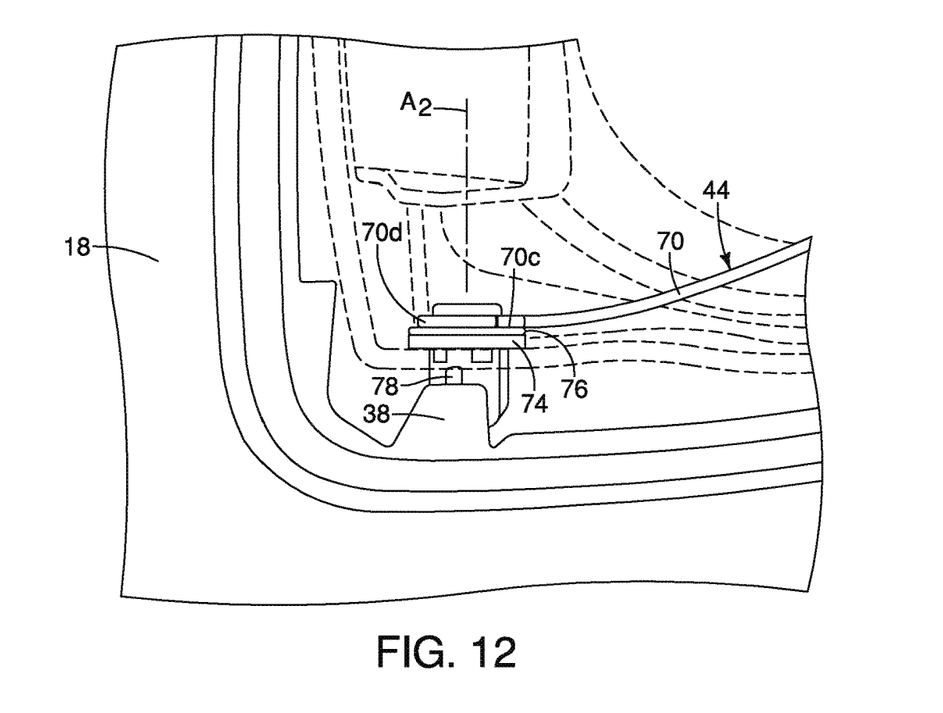
FIG. 12 is an outboard side view of the body panel and the tether with portions of the filler housing shown in phantom in accordance with the depicted embodiment.

As shown in FIG. 11, the pin receiving fixture 74 is installed to the fixture opening 64 to the horizontally extending surface 62 within the chamber 58 of the filler housing 40. The pin receiving fixture 74 further retains a portion of the electrically conductive metal member 78. The pivot pin 72 is installed to the pin receiving fixture 74 by, for example, a snap-fitting connection with the pivot pin 72 contacting the electrically conductive metal member 78. The pivot pin 72 is inserted through the central opening 70e of the second end 70c of the flexible line 70 thereby retaining it and the washer 76 to the pin receiving fixture 74.

The pivot pin 72, the electrically conductive metal member 78 and the flexible line 70 are all made of or with electrically conductive materials. For example, the pivot pin 72 can be made of metal and the flexible line 70 (including the first end 70a and the second end 70c) can be made of a plastic or polymer-based material that includes electrically conductive materials. The projection 38, which is a part of the body panel 18, is also electrically conductive. When the filler housing 40 and the tether 44 are fully installed to the body panel 18, a direct grounding electrical connection is made from the filler tube cap 42 to the body panel 18 (which is grounded to the electrical system of the vehicle) via the tether 44.

Further, the second end 70c and the flexible line 70 are free to pivot relative to the pivot pin 72 about a vertical axis $A_2$, as shown in FIG. 5. Specifically, FIG. 5 shows the flexible line 70 in a stowed orientation in solid lines. During a re-fueling of the vehicle 10, the filler tube cap 42 is removed from the filler tube 56 and moved out of the chamber 58 thereby pivoting the second end 70c and the flexible line 70, as shown in phantom in FIG. 5.

Since the pivot pin 72 pivots about the vertical axis $A_2$ perpendicular to the horizontally extending surface 62, the filler tube cap 42 is more easily moved out of the chamber 58 and can be stored on a projection or hook (not shown) on the interior of the door 30. Pivoting of the pivot pin 72 about the vertical axis $A_2$ greatly improves the movement of the filler tube cap 42 into and out of the chamber 58, as compared to other configurations where structures that serve as pivot pins are inclined relative to vertical or move about a horizontal axis. Since movement of the filler tube cap 42 is typically in a horizontal direction in and out of the chamber 58, pivoting movement of the flexible line 70 about the vertical axis $A_2$ is more logical and more advantageous.

The vehicle features and structures, other than the fuel filler structure 14, are conventional components that are well known in the art. Since these features and structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the fuel filler structure. Accordingly, these terms, as utilized to describe the present invention should be interpreted relative to a vehicle equipped with the fuel filler structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A fuel filler structure comprising:
    a vehicle body panel having an inboard surface and an outboard surface with a fuel filler opening extending from the outboard surface to the inboard surface;
    a filler housing having an outboard side and an inboard side, the outboard side being installed to the vehicle body panel at least partially surrounding the fuel filler opening dimensioned to receive and surround a portion of a fuel filler tube, the outboard side of the filler housing including an outer peripheral edge that is fixedly attached to the inboard surface of the vehicle body panel and includes a horizontally extending surface below the fuel filler tube, the horizontally extending surface having a fixture opening;
    a filler tube cap configured to removably attach to the fuel filler tube at least partially within the filler housing; and
    a tether attached at a first end to the filler tube cap and attached at a second end to the filler housing for pivoting movement about a vertical axis.

2. The fuel filler structure according to claim 1, further comprising
    a door attached to the filler housing for movement between a closed position concealing the filler housing, the filler tube cap and the tether.

3. The fuel filler structure according to claim 2, wherein the door has a non-rectangular shape with six edge portions angularly offset from adjacent ones of the six edge portions.

4. The fuel filler structure according to claim 3, wherein the vehicle body panel includes a recessed area surrounding the fuel filler opening dimensioned and shaped to receive the door.

5. The fuel filler structure according to claim 1, further comprising
    a pivot pin, and a pin receiving fixture that is installed to the fixture opening, the pivot pin extending through a loop in the second end of the tether and an attachment opening in the pin receiving fixture such that the second end of the tether pivots about the pivot pin.

6. The fuel filler structure according to claim 5, wherein the fuel filler opening of the vehicle body panel is defined by a peripheral edge encircling the fuel filler opening, a lower edge section of the peripheral edge includes a projection extending upward from the peripheral edge into the fuel filler opening.

7. The fuel filler structure according to claim 6, wherein the projection of the peripheral edge of the fuel filler opening of the vehicle body panel contacts the pin receiving fixture with the filler housing installed to the vehicle body panel and the pin receiving fixture installed to the filler housing.

8. The fuel filler structure according to claim 7, wherein the vehicle body panel, the pin receiving fixture and the pivot pin are all made of electrically conductive materials such that with the filler housing installed to the vehicle body panel and the pin receiving fixture installed to the filler housing, the tether is grounded to the vehicle body panel.

9. The fuel filler structure according to claim 1, wherein the vehicle body panel includes a wheel well portion adjacent to and below the fuel filler opening.

10. A fuel filler structure comprising:
a vehicle body panel defines a fuel filler opening;
a filler housing having an outboard side and an inboard side, the outboard side being installed to the vehicle body panel at least partially surrounding the fuel filler opening dimensioned to receive and surround a portion of a fuel filler tube;
a filler tube cap configured to removably attach to the fuel filler tube at least partially within the filler housing; and
a tether attached at a first end to the filler tube cap and attached at a second end to the filler housing for pivoting movement about a vertical axis, the vertical axis being defined by a pivot pin, and a pin receiving fixture that are installed to the filler housing.

11. The fuel filler structure according to claim 10, further comprising
a door attached to the filler housing for movement between a closed position concealing the filler housing, the filler tube cap and the tether, the door having a non-rectangular shape with six edge portions angularly offset from adjacent ones of the six edge portions.

12. The fuel filler structure according to claim 11, wherein the vehicle body panel includes a recessed area surrounding the fuel filler opening dimensioned and shaped to receive the door.

13. The fuel filler structure according to claim 10, wherein the vehicle body panel has an inboard surface and an outboard surface with the fuel filler opening extending from the outboard surface to the inboard surface, the outboard side of the filler housing including an outer peripheral edge that is fixedly attached to the inboard side of the vehicle body panel and includes a horizontally extending surface below the fuel filler tube, the horizontally extending surface having a fixture opening, the pin receiving fixture extending in to the fixture opening.

14. The fuel filler structure according to claim 10, wherein the fuel filler opening of the vehicle body panel is defined by a peripheral edge encircling the fuel filler opening, a lower edge section of the peripheral edge includes a projection extending upward from the peripheral edge into the fuel filler opening.

15. The fuel filler structure according to claim 14, wherein the projection of the peripheral edge of the fuel filler opening of the vehicle body panel contacts the pin receiving fixture with the filler housing installed to the vehicle body panel and the pin receiving fixture installed to the filler housing.

16. The fuel filler structure according to claim 15, wherein the vehicle body panel, the pin receiving fixture and the pivot pin are all made of electrically conductive materials such that with the filler housing installed to the vehicle body panel and the pin receiving fixture installed to the filler housing, the tether is grounded to the vehicle body panel.

17. The fuel filler structure according to claim 10, wherein the vehicle body panel includes a wheel well portion adjacent to and below the fuel filler opening.

* * * * *